Jan. 29, 1957
P. C. KEITH
2,779,667
GAS GENERATION
Original Filed Aug. 24, 1946
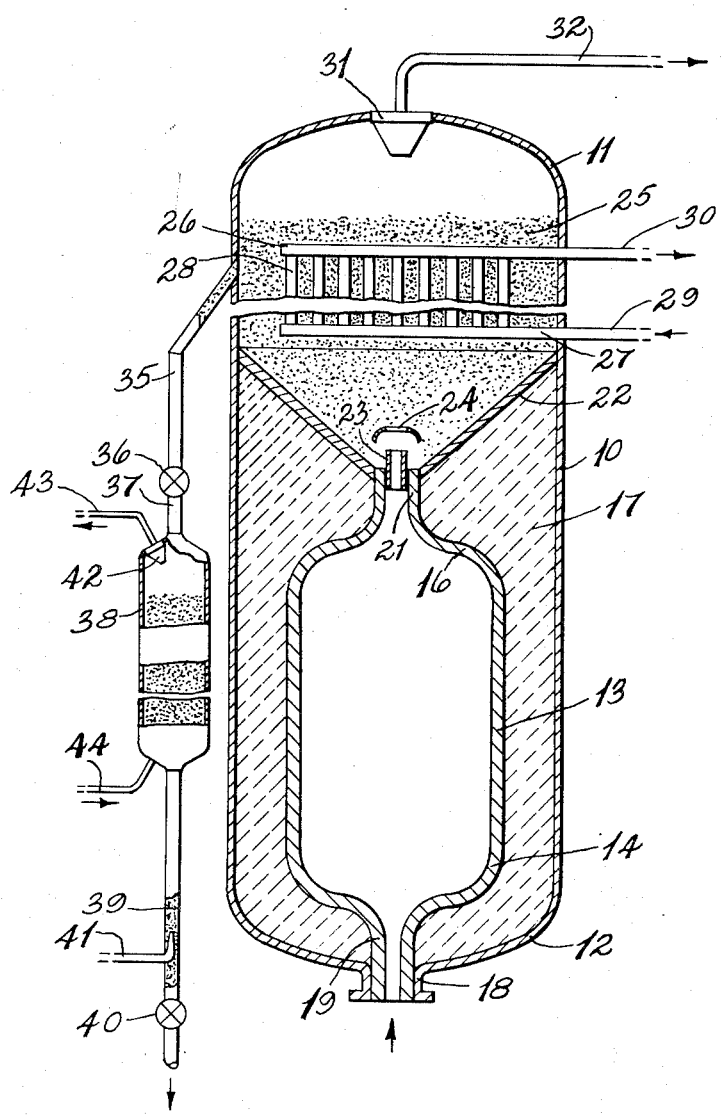
INVENTOR.
PERCIVAL C. KEITH
BY J. H. Grahame
ATTORNEY United States Patent Office 2,779,667
Patented Jan. 29, 1957

2,779,667

GAS GENERATION

Percival C. Keith, Peapack, N. J.

Continuation of application Serial No. 692,875, August 24, 1946. This application August 5, 1952, Serial No. 302,771

3 Claims. (Cl. 48—196)

The present invention relates to the generation of gases and is more specifically concerned with the generation of essentially hydrogen-carbon monoxide mixtures of the type known as synthesis gas suitable for use in the catalytic manufacture of hydrocarbons and their oxygenated derivatives.

The usual process for generating mixtures of hydrogen and carbon monoxide, hereinafter referred to for purposes of convenience as "synthesis gas," from hydrocarbons involves essentially the reaction of hydrocarbons with appropriate proportions of oxygen with or without supplements of carbon dioxide and/or water vapor. The hydrocarbon-oxygen reaction is exothermic whereas the reaction of the hydrocarbon with either carbon dioxide or water vapor is endothermic. As is known, rather high temperatures are essential for a reasonably good conversion.

This normally means that the gaseous product is discharged from the generator at a high temperature. For example, in many operations of which I am aware the synthesis gas frequently flows out of the generator at a temperature of 2100° F., and sometimes as high as 3000° F. or thereabove. Temperatures of this range and even substantially therebelow introduce major problems of construction and engineering since they are far above the range in which gases can be handled by conventional tubing and equipment. The same remarks apply to the use of conventional heat exchangers which become a practical necessity where the process is to be operated under the usual limitations of good heat conservation.

One object of the present invention is to provide for the prompt cooling of the synthesis gas from the generator under conditions which result in a sharp temperature drop to a condition wherein the gases are capable of being readily handled and particularly wherein the energy change involved in this temperature drop may be efficiently converted to useful purposes. In this connection an important object contemplates the rapid cooling of the gases under such conditions that the cooling instrumentalities may operate under reasonable and practical ranges of temperature and may accordingly be constructed of conventional materials to generate steam or otherwise usefully employ the available thermal energy at reasonable temperatures.

Another important object of the present invention contemplates the process of gas generation under substantially uniform conditions of temperature, time of contact, and admixture of the reactants in a generation zone of predetermined size and character particularly wherein the products are sharply reduced in temperature in order to terminate reaction immediately at the extremity of the gas generation zone.

Other important objects contemplate the controlled interaction of the reactants, together with rapid and controlled quenching of the products, and the provision of a system wherein a contact mass or powdered thermophore operates in the cooling or quenching zone.

The invention more particularly contemplates the generation of synthesis gas at elevated temperatures with discharge of the product, at high temperatures and as formed, directly into a fluidized mass of solid particles disposed in heat exchange relation to adequate cooling surfaces operative to maintain the fluidized mass at uniform temperature quite materially below that of the gas generation zone. The flow of gas from the generator may be quite adequate to maintain the powdered thermophore or contact mass in a state of proper fluidization whereby the rate of heat transfer to the cool surfaces is materially enhanced and the entire cooling zone maintained continuously at a relatively low temperature, free from the detrimental effects of excessive thermal conditions.

As is known, the technique of fluidization normally involves the passage of a gas upwardly through a mass of solid particles of such size, relative to the rate of gaseous flow, that the particles are individually suspended in the gas and yet exhibit "hindered settling" or slippage in the gas stream. When such a system is operated under a condition known as dense phase fluidization, the powder assumes the appearance of a boiling liquid with a well-defined upper pseudo liquid surface or level from which the gaseous products emerge.

Fluidization results in a number of advantages, most important of which are a propensity toward complete uniformity of temperature and other conditions throughout the mass of particles and the maintenance of an exceptionally good degree of heat transfer between the several phases of the system and the cooling surfaces, usually characteristic of exceptionally good liquid heat transfer. Presumably these effects are largely or entirely due to the fact that each of the particles, suspended or buoyed up in the gas flow, tends to vibrate or move violently in a random path throughout the mass and in such a manner as to distribute sensible heat content uniformly to all other particles and to the cooling surfaces. Moreover, as indicated above, the ease of handling fluidized powder, comparable with the control of a fluid, enables the effective withdrawal or circulation of any portion of the fluidized mass for purposes of regeneration or other treatment.

The powder used for fluidization may perform any of a number of functions depending upon its character and composition. It may be a completely inert material functioning solely as a means for effecting the thermal or other physical results desired. In any event it is necessarily formed of some suitable material capable of withstanding the temperature and reaction conditions prevailing in the system. Such a material may well be illustrated by any of the common refractories such, for example, as magnesia, zirconia, thoria, high-temperature fire clay, Carborundum, graphite and the like.

Referring now to the accompanying drawing, which illustrates more or less diagrammatically one preferred means for carrying out the process of the present invention, the numeral 10 represents a generator shell of cylindrical cross section closed at its upper and lower extremity by means of curved wall sections 11 and 12 respectively. Internally the generator shell is divided into two sections, namely, a lower or gas generation section and an upper, cooling or quenching section.

The gas generation section consists essentially of an internal chamber having refractory walls consisting of a central cylindrical section 13, a lower frusto-conical sections 14 and an upper arch 16. The several sections of the refractory lining are supported in a surrounding mass of refractory insulating material 17 enclosed by the shell.

It is to be noted that the lower wall 12 of the generator shell is provided with an inlet fitting 18 for supplying reactant feed to the gas generation zone and is provided with a refractory lining 19 in the form of a cylindrical tube extending into the generation zone and meeting the lower refractory wall 14.

The present illustrative embodiment contemplates the introduction of reactants, such as methane and oxygen with or without additional reactants in admixture through inlet 18. The reactants may advantageously be preheated, either in admixture or separately, by any suitable preheating means, not disclosed, so that they reach the reaction zone in a suitable condition for the production of an essentially hydrogen-carbon monoxide product.

The upper wall 16 of the gas generation chamber is flared upwardly as at 21 to provide an outlet nozzle or duct which merges at its upper extremity with the frustoconical wall 22 forming the bottom of the quenching or cooling zone. In order to prevent powdered material, as will hereinafter be more fully described, from passing downwardly into the gas generation chamber, the outlet 21 is advantageously provided with a tubular insert 23 extending somewhat thereabove and being surmounted by a vertically spaced baffle 24 of downwardly facing concave arrangement with an annular margin which extends about the upper margin of the tube 23 in spaced relation. Obviously, therefore, the gases leaving the reaction zone are free to pass upwardly through the outlet 21 and tube 23 and are directed downwardly and about the margin of the baffle 24 into the powdered fluidized mass 25 occupying the cooling zone.

The cooling zone is occupied by cooling means which may take the form of any conventional heat exchange element and in the embodiment shown is represented, more or less diagrammatically, by a pair of vertically spaced headers 26 and 27 communicating with a multiplicity of parallel spaced cooling tubes 28. Liquid coolant, such as water, Dowtherm or the like, may be introduced through inlet pipe 29 and circulated out through outlet pipe 30. Alternatively, as is known, the coolant may be caused to vaporize within the cooling unit at any predetermined temperature controlled advantageously by the pressure maintained therewithin, as a means of transforming the available heat energy into a suitable vapor which may be withdrawn by outlet pipe 30. In any event it will be apparent that the heat thus extracted from the system is ideally in form suitable for further use or recovery.

It is quite desirable that the cooling unit be so constructed and arranged that it not only provides adequate cooling capacity for the flow of hot gases contemplated, but that the cooling surfaces or exchanger be so configurated as to permit relative streamlined flow of the gases and the fluidized powder thereabout, with complete freedom from so-called dead spots and other areas of localized temperature variation.

The gases which pass into the lower portion of the cooling zone about the margin of the baffle 24, move upwardly through the fluidized powder, and are liberated from the upper pseudo-liquid level of the powdered mass, whence they pass through the filter 31 and outwardly through the outlet conduit 32 for further use or treatment.

In the embodiment disclosed a standpipe means 35 communicating with the interior of the cooling chamber is provided with a suitable mechanical controller or valve 36 such, for instance, as a star feeder, for withdrawing the powder in controlled amounts for treatment. To this end the mechanical feeder 36 discharges into standpipe 37 communicating with a treating vessel 38. An outlet standpipe 39 communicates with a second valve 40 which discharges the treated powder.

An inlet pipe 41 permits the introduction of any suitable gaseous stream into the mass of powder in the standpipe 39 and the treating vessel 38, which passing through the powder under fluidizing conditions, discharges through the filter 42 and the outlet pipe 43. This affords suitable means for limiting the accumulation of carbon on the powder. In other words, a relatively small stream of oxygen or air supplied through inlet pipe 41 will burn the carbon deposited and permit the return of clean powder to the system.

In operation it will be apparent that the mixture of feed gases is introduced into the reaction zone at such rate and under temperature conditions such as to permit the interaction of the components. It will be understood, however, that the reaction zone will initially be preheated to the required temperature in any suitable manner, as by burning methane with an excess of oxygen, until the desired temperature is reached. In any event, during settled operation, the interior of the generation zone is held at the appropriate predetermined temperature of reaction. Depending upon the rate of introduction and the relative size of the unit, the reactants may be exposed for a predetermined time period to predetermined uniform conditions of reaction.

Upon discharge from the gas generation zone the gases immediately pass upwardly through the tube 23 about the baffle 24 and into the quenching or cooling zone thereabove.

It is particularly important to note that the cooling zone by virtue of the good conditions of heat transfer and temperature uniformity inherent in the fluidized powder therein may operate at a temperature quite substantially below the temperature of the gases issuing from the generation zone. This temperature, of course, will depend upon size and design of the cooling zone as well as the construction of the cooling surfaces and the coolant employed in connection therewith. Advantageously, the fluidized powder in the cooling or quenching zone may be held at a temperature in the range, for example, of 500° F. to 1000° F. and this may be accomplished without excessive size or complexity of the apparatus. Of even greater importance, however, is the fact that the issuing generator gases need not pass through the usual cooling gradient of substantial extent, but actually are cooled with great rapidity comparable to a quenching action. In effect, and by way of theoretical explanation, it appears that the turbulence of the fluidized mass is such as to continuously present relatively cool particles to the incoming hot stream. In short, there is a temperature drop to the desired level by "dry quenching" with relatively cold powder. As a result, no parts of the cooling zone need be subjected to excessive heat and accordingly may operate continuously without the disadvantage of severe thermal conditions.

As before indicated, the cooled synthesis gas passes outwardly through conduit 32 for further treatment or utilization. In fact, with the present arrangement, the generator gases need not be cooled or quenched to any temperature lower than that desirable for convenient handling and may pass directly from the conduit 32 into any suitable heat exchanger, steam boilers, or heat engine adapted to economically utilize the sensible heat of the gases. In short, the cooling zone of the present generator may be operated either to recover all of the required sensible heat or alternatively may be operated to lower the gas temperature to a resonable range for permitting the efficient use of subsequent heat economizers.

Further utilization of the gas forms no part of the present invention but, for purposes of the illustration, this product may be directly supplied, at any appropriate temperature, to the inlet conduit of a reactor operating for the catalytic reduction of carbon monoxide by hydrogen in the production of hydrocarbons and/or oxygenated hydrocarbons.

In the treating vessel 38 and the standpipe 39, the powder may be subjected to the passage of any suitable treating fluid through line 41. For example, carbon may, and frequently does, tend to deposit upon the solid particles and this may be burned by the supply of relatively pure oxygen or of an oxygen-containing gas through pipe 41 preferably introduced at such rate as to maintain the powder in a fluidized condition. The gaseous products of combustion are withdrawn through pipe 43 and clean powder is returned to the quenching zone. The invention, however, is not limited to the treatment of the powder by burning of the carbon.

The present invention accordingly provides a construction whereby reactant gases reside for predetermined period of time in good admixture under carefully controlled reaction conditions, are then promptly cooled to any predetermined temperature, preferably below reaction temperature, with simple recovery of sensible heat energy and are liberated in ideal condition for further use of treatment.

The invention can best be practiced with feed gases comprising, for instance, methane and relatively pure oxygen. On the other hand, it is possible to include quite substantial proportions of endothermically reacting feeds, namely, carbon dioxide and/or water vapor.

Where the temperature of the powder withdrawn through the standpipe 35 is too low for the removal of carbon by combustion, it will be appreciated that the treating vessel 38 and standpipe 39 may be operated at a higher temperature by introducing a suitable fuel, e. g., gas oil or methane, through inlet pipe 44. Vessel 38 may also be fired externally, if required.

In accordance with one example, a mixture of methane and oxygen is introduced through inlet 18 in approximately the molar ratio of 2:1, appropriate to permit reaction in the generation zone. The generation zone is maintained at a temperature of about 2100° F. The flow of gas is adjusted to provide an internal linear velocity of about one foot per second in the generator, calculated at the approximate temperature of the generator. The mixture of gas is preheated to about 600° F. The effluent gases pass into the quenching or cooling zone maintained continuously at a temperature of approximately 650° F. throughout and operating with a mass of fluidized powdered zirconia of from about 200 to 400 mesh.

The residence time of the gases in the generator is about 0.5 second and the residence time in the cooling zone is about 1 second. The effluent gases from the cooling zone consist essentially of hydrogen and carbon monoxide in approximate molar ratio of 2:1 with less than 5% nitrogen, carbon dioxide, and other diluent gases.

The heat recovery from the cooling exchanger in the quenching zone is closely equivalent to 100% of the heat energy lost through the temperature drop in the generator gases.

In other examples, a portion of the oxygen may be substituted by carbon dioxide and/or water vapor with good conversion substantially in accordance with theoretical.

The term "powder" and "mass of particles" and the like as used herein are intended to cover those compositions of loose, discrete particulate material capable of being fluidized in accordance with principles known in the art by the passage of gases vertically therethrough. Such may vary widely in density and particle size and it will be understood that an appropriate flow of gases will be provided to maintain the specified conditions.

The oxygen used in the process of this invention is preferably of at least 95% purity; such a product is readily available from conventional processes for the liquefaction and rectification of air. However, where inert diluents like nitrogen are not considered troublesome in subsequent operations with the synthesis gas produced, air or oxygen-enriched air (e. g., 40% oxygen) may be utilized.

The present invention accordingly provides a fast quench for the hot generator gases and permits the effective generation of steam down to, for example, a gas temperature of 500° F. In addition, it is possible to more accurately control the time the reactants are subjected to controlled reaction conditions. Again, this latter advantage is strengthened by the immediate quenching action without contamination of extraneous liquids which promptly terminates additional or side reactions or the excessive formation of carbon which may tend to proceed where high temperatures are unduly prolonged. In addition to the advantage of burning the carbon or otherwise treating the solid particles, it is particularly important to note that the invention permits substitution for the gaseous hydrocarbon feed, at least in part, of a hydrocarbon liquid, such as fuel oil, which may be preheated to a vapor state or may actually be sprayed into the gas generation zone where vaporization and combustion immediately proceed.

This application is a continuation of my pending application Serial No. 692,875, filed August 24, 1946, and now abandoned.

Obviously, many modifications and variations of the invention will be apparent to those skilled in the art in the light of the foregoing disclosures without any enlargement of the spirit and scope thereof, and therefore only such limitations should be imposed as are indicated in the following claims.

I claim:

1. In the process for the production of carbon monoxide and hydrogen by reacting hydrocarbon with an oxygen-containing gas at a temperature autogenously maintained in the range of about 2100 to 3000° F. such that said hydrocarbon and oxygen are converted predominantly to carbon monoxide and hydrogen with the incidental production of free carbon, the improvement which comprises cooling the reaction gases from said reaction temperature to a temperature of about 650° F. in a period of about 1 second by contacting said reaction gases with a fluidized dense phase mass of solid particles of refractory maintained at a temperature of about 650° F. by direct contact with cooling surfaces, effecting simultaneous cooling of said reaction gases and removal of free carbon therefrom, withdrawing the thus cooled reaction gases substantially free of carbon from said fluidized mass, withdrawing solid particles of refractory containing entrapped carbon from said fluidized mass, subjecting said withdrawn particles to regeneration by combustion of carbon therefrom with an oxygen-containing gas, and returning regenerated particles to said fluidized mass.

2. In a process for the production of carbon monoxide and hydrogen by reacting a hydrocarbon with oxygen-containing gas at a temperature autogenously maintained in the range of about 2100 to 3000° F. effecting conversion of said hydrocarbon predominantly to carbon monoxide and hydrogen with the incidental production of free carbon, the improvement which comprises conducting the resulting products of reaction at substantially reaction temperature into a fluidized dense phase mass of solid particles of refractory maintained at a temperature in the range of 500 to 1000° F. effecting rapid cooling of said reaction products with simultaneous deposition of free carbon in said fluidized mass, discharging cooled gaseous products of reaction substantially free of carbon from said fluidized mass, withdrawing solid particles of refractory containing entrapped carbon from said fluidized mass, and introducing refractory particles substantially free from carbon to said fluidized mass to replace said particles withdrawn therefrom.

3. A process according to claim 2 wherein solid particles of refractory containing entrapped carbon withdrawn from said mass are subjected to regeneration by combustion of carbon therefrom with an oxygen-containing gas and refractory particles so regenerated returned to said fluidized mass to replace said withdrawn particles.

References Cited in the file of this patent

UNITED STATES PATENTS

| | | |
|---|---|---|
| 1,843,063 | Burke | Jan. 26, 1932 |
| 2,051,363 | Beekley | Aug. 18, 1936 |
| 2,396,709 | Leffer | Mar. 19, 1946 |
| 2,420,542 | Jahnig | May 13, 1947 |
| 2,443,210 | Upham | June 15, 1948 |
| 2,605,174 | Krejci | July 29, 1952 |